(12) United States Patent
Carlsson et al.

(10) Patent No.: US 8,199,601 B2
(45) Date of Patent: Jun. 12, 2012

(54) SYSTEM AND METHOD OF SELECTIVELY VARYING SUPPLY VOLTAGE WITHOUT LEVEL SHIFTING DATA SIGNALS

(75) Inventors: Anders Carlsson, Lund (SE); Thomas Olsson, Karlshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 243 days.

(21) Appl. No.: 12/783,957

(22) Filed: May 20, 2010

(65) Prior Publication Data

US 2011/0286289 A1    Nov. 24, 2011

(51) Int. Cl.
*G11C 5/14* (2006.01)
(52) U.S. Cl. ......................... 365/227; 365/226
(58) Field of Classification Search .................. 365/227, 365/226
See application file for complete search history.

(56) References Cited

U.S. PATENT DOCUMENTS

| | | | |
|---|---|---|---|
| 6,792,582 | B1 | 9/2004 | Cohn et al. |
| 2004/0153592 | A1 | 8/2004 | Parviainen et al. |
| 2007/0288782 | A1 | 12/2007 | Chang et al. |
| 2008/0034235 | A1 | 2/2008 | Houshaku |
| 2009/0189639 | A1 | 7/2009 | Wingen |
| 2009/0262588 | A1 * | 10/2009 | Vilangudipitchai et al. .................. 365/189.11 |
| 2010/0329062 | A1 * | 12/2010 | Campbell et al. ............. 365/226 |
| 2011/0193592 | A1 * | 8/2011 | Lin et al. ......................... 326/80 |

OTHER PUBLICATIONS

Flautner, Kristian, et al. "IEM926: An Energy Efficient SoC with Dynamic Voltage Scaling", Proceedings of the Date Conference 2004. IEEE, (http://www.date-conference.com/archive/conference/proceedings/PAPERS/2004/DATE04/DF_FILES/10D_6.PDF.

Mak, Wai-Kei and Chen, Wei, Jr., "Voltage Island Generation Under Performance Requirement for SoC Designs"; Design Automation Conference, 2007. ASP-DAC '07. Asia and South Pacific; Jan. 23-26, 2007, ppg. 798-803, Yokohama.

* cited by examiner

*Primary Examiner* — Tuan T. Nguyen
(74) *Attorney, Agent, or Firm* — Coats & Bennett, P.L.L.C.

(57) ABSTRACT

An electronic system implements a plurality of voltage domains, at least one of which has a selectively variable supply voltage, without requiring the use of a large number of level shifters (e.g., for each data and/or address line). The supply voltage for a first domain is set equal or nearly equal to that of a second domain for a first duration, when the two domains are connected for data transfer across a system bus. When the first domain is isolated from the bus, its supply voltage is set differently from that of the second domain for a second duration. In the second duration, the first domain may have a higher supply voltage, e.g., to perform high-performance computational tasks. Alternatively, it may have a lower supply voltage, to conserve power, if its computational task is less demanding.

15 Claims, 5 Drawing Sheets

SYSTEM AND METHOD OF SELECTIVELY VARYING SUPPLY VOLTAGE WITHOUT LEVEL SHIFTING DATA SIGNALS

TECHNICAL FIELD

The present invention relates generally to electronic systems, and in particular to a method and apparatus for supplying different voltage regions within a system with different supply voltage levels, without the use of level shifters on all data signals crossing voltage region boundaries.

BACKGROUND

Digital electronic systems are ubiquitous. As solid state technology has advanced, shrinking feature size and concomitantly increasing both circuit density and operating speed, supply voltage levels have dropped. Lower supply voltage for digital circuits reduces current flow (switching current as well as losses such as leakage and crossbar currents), and hence power consumption. Reduced power consumption is important for reducing generated heat, which must be removed, such as by convection (cooling fans). Reduced power consumption is particularly important for portable electronic devices, to preserve battery life.

However, reducing the supply voltage to digital circuits may also limit their performance. For example, since switching current is the primary source of power consumption in CMOS technology, restricting the supply voltage in many cases restricts the achievable clock speed.

It is well known that, within one system, different circuits may operate optimally at different power supply voltage levels. For example, a memory circuit (e.g., DRAM, static RAM, flash, EEPROM) may operate at its maximum required speed with a relatively low supply voltage. On the other hand, a computational circuit (e.g., CPU, ALU, DSP, graphic or video processor) may require a higher supply voltage to achieve a desired level of performance, for example by running at a higher clock speed. Furthermore, an analog circuit, such as a radio transceiver, may have a digital interface operating at the analog voltage level, which may be higher or lower than the system digital circuits.

One approach to disparate supply voltage requirements within a system is the creation of "voltage islands," or regions on a chip or circuit board that are supplied with a supply voltage level different than other islands, or regions. One problem with the conventional voltage island approach is that level shifters must be interposed on every signal (e.g., every data and address bit, and every control signal) that crosses an island boundary. Level shifters are required to preserve signal integrity in transition between circuits operating under different supply voltages—for example, a "high" signal level generated in a low-voltage island may be interpreted as a "low" value when received in a high-voltage island. Additionally, level shifters prevent low voltage gates from being directly driven with high supply voltages, which would cause excessive leakage energy. Level shifters necessarily take up silicon area, consume power, and introduce propagation delay in the shifted signal.

Level shifters may be designed to minimize their deleterious effects on system cost and performance. For example, FIG. 5 depicts a single-bit level shifter implemented with only six transistors. Such level shifters introduce little cost in small numbers, and many signals (e.g., control signals such as interrupts) are not on critical performance paths, and hence can tolerate the additional delay. It is the requirement of level-shifting entire data and address buses—which can span hundreds of bits and the delay of which may limit system performance—which stands as a primary challenge in implementing the voltage island approach to digital system design.

Driven by ever-larger quantities of data to be processed, and enabled by the development of burst-mode memory (e.g., DDR DRAM), many modern electronic systems have adopted a burst or frame model for system bus transactions. That is, many system buses define one or more durations (e.g., in terms of elapsed time or number of bus cycles) for which a system bus is dedicated to a particular intra-system data transfer. The receiving functional block then processes the received data, and may subsequently transfer data to another block, or to system memory.

As well known in the art, system buses are usually "tri-state," meaning bus drivers may assume three states: a logic high, a logic low, and a high impedance state. In the high impedance state, circuits on the other side of the driver are electrically isolated from bus activity. Thus, in the data transfers described above, after receiving data in a burst transaction, a receiving block would tri-state, or electrically isolate itself from the bus, allowing the bus to engage in other data transfer operations while the receiving block processed the received data.

SUMMARY

According to embodiments described and claimed herein, an electronic system implements a plurality of voltage domains, at least one of which has a selectively variable supply voltage, without requiring the use of a large number of level shifters (e.g., for each data and/or address line). The supply voltage for a first domain is set at or near to that of a second domain for a first duration when the two domains are connected for data transfer across a system bus. When the first domain is isolated from the bus, its supply voltage is set differently from that of the second domain for a second duration. In the second duration, the first domain may have a higher supply voltage to perform high-performance computational tasks. Alternatively, it may have a lower supply voltage if its computational task is less demanding. The supply voltage for the first voltage domain is again set equal to that of the second domain when the two are again connected for data transfer across the bus. The first voltage domain may write results to the second voltage domain (or another block), and/or may receive additional data for processing.

One embodiment relates to a method of operating an electronic system at a plurality of supply voltage levels without level shifting individual data signals. The system is partitioned into a plurality of discrete voltage domains, the voltage domains interconnected by one or more data transfer buses. The supply voltage of a first voltage domain and second voltage domain are set equal or nearly equal for a first duration, during which the first and second voltage domains are connected in data transfer relationship via a bus. The supply voltage of the first voltage domain is set to a different level than that of the second voltage domain for a second duration, during which the first and second voltage domains are electrically isolated from each other.

Another embodiment relates to an electronic system. The system includes a first circuit having a variable supply voltage and comprising a first voltage domain, and a second circuit comprising a second voltage domain. The system also includes a data transfer bus configurably connecting at least the first and second voltage domains. The system further includes a voltage control circuit supplying a variable supply voltage to at least the first voltage domain. The voltage control circuit is operative to set the supply voltage supplied to the first voltage domain equal or nearly equal to the supply voltage of the second voltage domain during a first duration during which the first and second voltage domains are connected in data transfer relationship via the bus; and is further operative to set the supply voltage supplied to the first voltage domain differently than the supply voltage of the second voltage domain during a second duration during which the first and second voltage domains are electrically isolated from each other.

DETAILED DESCRIPTION

Figure 1:
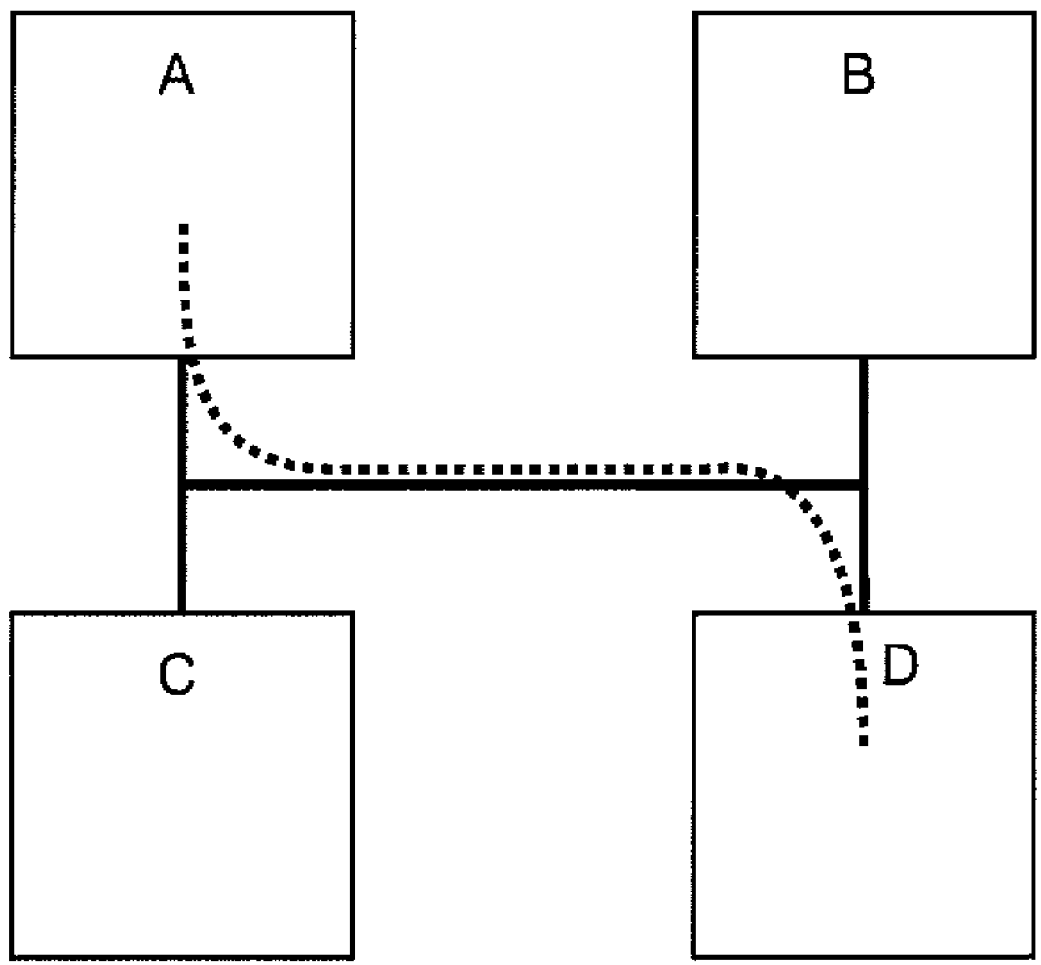
FIG. 1 is a block diagram of an electronic system divided into a plurality of voltage domains, interconnected by a system bus.

FIG. 1 is a block diagram of a representative electronic system. The system is divided into four voltage domains A-D, connected by a tri-state system bus. Each voltage domain may comprise digital electronic circuits, or analog circuits with a digital interface. The bus preferably operates on a frame basis, in which data is transferred across the bus in bursts. A source and destination voltage domain are electrically connected via the system bus only for the duration of the burst data transaction. At least one voltage domain A-D, and up to all voltage domains A-D, may receive a variable supply voltage level, such as from a central power management circuit (not shown). A variable voltage domain matches its supply voltage level to that of the other voltage domain involved in a data transfer across the system bus, for the duration of the data transaction.

Assume voltage domain A comprises memory. In one embodiment, the voltage domain A may have a fixed supply voltage level. The voltage domain D comprises a computational circuit, such as, e.g., a video compression/decompression circuit. The voltage domain D is supplied with a variable supply voltage level, which may be higher or lower than the supply voltage level of voltage domain A when the two voltage domains are isolated. However, the supply voltage level supplied to the voltage domain D is matched or nearly matched to that of the voltage domain A for the duration of data transfers between voltage domains A and D across the system bus. Alternatively, where both voltage domains A and D have variable supply voltages, both domains adjust their supply voltage level to, or near to, a predefined system bus voltage level.

Note that perfect equality of supply voltage levels when voltage domains A and D are connected via a data transfer bus is not strictly required. Rather, what is important is that the supply voltage levels of the two voltage domains are so close as to minimize the probability of erroneous interpretation of a signal level. For example, if a signal generated by one voltage domain (having a relatively low supply voltage level) at a "high" level is at or near the threshold between "high" and "low" signals in the other voltage domain (having a relatively low supply voltage level), there is a significant probability that the signal may be interpreted incorrectly as a "low" level by a receiving circuit in the voltage domain having the relatively higher supply voltage level. Accordingly, as used herein, the phrases "equal or nearly equal to," "the same or nearly the same as," "matched or nearly matched to," "at or near to," and the like, when referring to voltage domains assuming comparable supply voltage levels, mean that the voltage domains assume either the same supply voltage level, or supply voltage levels so close as to obviate any significant probability of erroneous signal level interpretation as a result of the difference in supply voltage levels.

Figure 2:
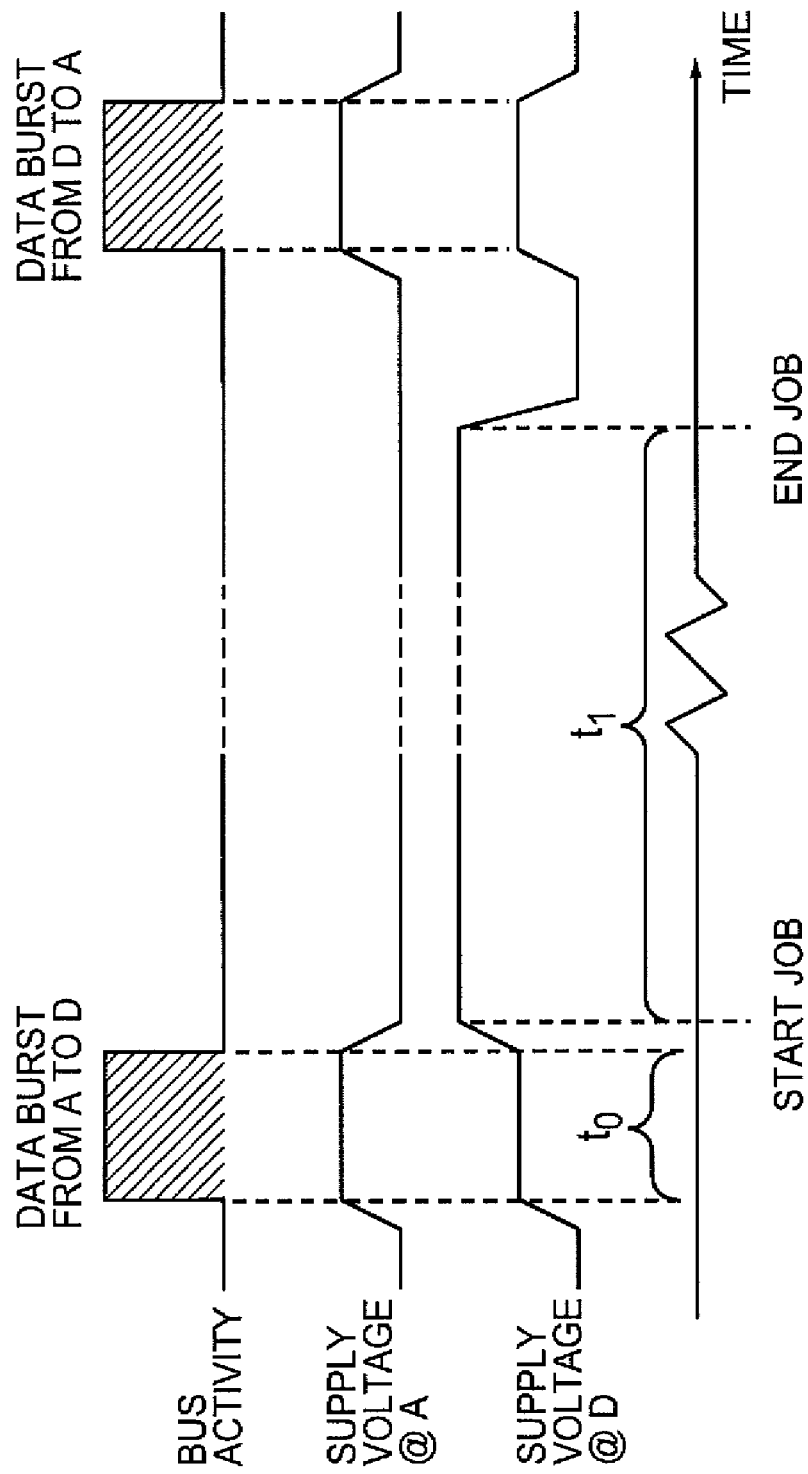
FIG. 2 is a timing diagram of voltage domain D from FIG. 1 operating at a higher supply voltage than domain A.

FIG. 2 depicts the case that, to achieve a desired performance, the computational circuit in voltage domain D operates at a higher supply voltage level than does the memory in voltage domain A. For a first duration, marked $t_0$, the supply voltage level supplied to the voltage domain D is equal, or nearly equal, to that supplied to the voltage domain A. During $t_0$, voltage domains A and D are electrically interconnected by the system bus, as data is transferred from A to D. This could be a short as one bus cycle, but is preferably a burst transaction comprising a plurality of bus cycles. Because the supply voltages supplied to voltage domains A and D are equal or nearly equal, no level shifters are required on at least the data and address lines on the system bus.

Following $t_0$, for a second duration, marked $t_1$, the supply voltage supplied to voltage domain D is higher than that supplied to voltage domain A. This allows the computational circuit to operate at a higher clock speed to process the received data at a desired performance level. The higher supply voltage supplied to voltage domain D does not affect any circuit in, e.g., voltage domain A, as the two voltage domains are electrically isolated by tri-state drivers interfacing to the system bus. While voltage domain D is working, the bus may of course perform data transfers between other voltage domains A, B, C (any of which may have a variable supply voltage level that is matched to its partner voltage domain during a data transfer cycle).

FIG. 2 depicts the supply voltage level supplied to voltage domain A being reduced following the data transfer during $t_0$. This corresponds to an embodiment in which the supply voltage supplied to voltage domain A is variable, and no other voltage domain (e.g., B, C) requires data transfer to/from voltage domain A, allowing voltage domain A to enter an idle, or standby state. In one embodiment, the system bus operates at a predefined voltage level, and the supply voltage for voltage domain A alternates between the bus voltage and a low-voltage level. In other embodiments, the system bus may operate at one of a plurality of voltage levels, depending on the supply voltage levels of the voltage domains A-D involved in a given bus transfer. In some embodiments, where voltage domain A comprises main memory or a heavily utilized I/O interface and one system resource or another will require access substantially continuously, the supply voltage level supplied to voltage domain A may be fixed, with other voltage domains increasing or decreasing their supply voltage level to match as required for data transfers. In all such embodiments, a voltage supply controller may be integrated with a system bus arbitrator, or is coupled to an arbitrator via control signals, to coordinate the supply voltage levels supplied to different voltage domains with bus activity.

FIG. 2 depicts the end of a computation, marked "end job," at which time the voltage supply level for voltage domain D is reduced. Reducing the voltage reduces leakage and crossbar currents, further conserving power. In one embodiment, in which access to the system bus is arbitrated among two or more "master" devices, this may correspond to a duration during which voltage domain D has requested access to the system bus, but has not yet been granted access. In other embodiments, such as where access to the system bus is scheduled or otherwise predetermined, the computational task at voltage domain D may continue up until another data transfer, without decreasing the supply voltage level. FIG. 2 then depicts the supply voltage level supplied to voltage domain D again matching, or nearly matching, that supplied to voltage domain A to perform another data transaction across the system bus. This may, for example, comprise a write-back of processed data to memory, and/or retrieving new data for another computational task. As with $t_0$, this duration may comprise one bus cycle, but is preferably a burst transaction comprising a plurality of bus cycles.

Figure 3:
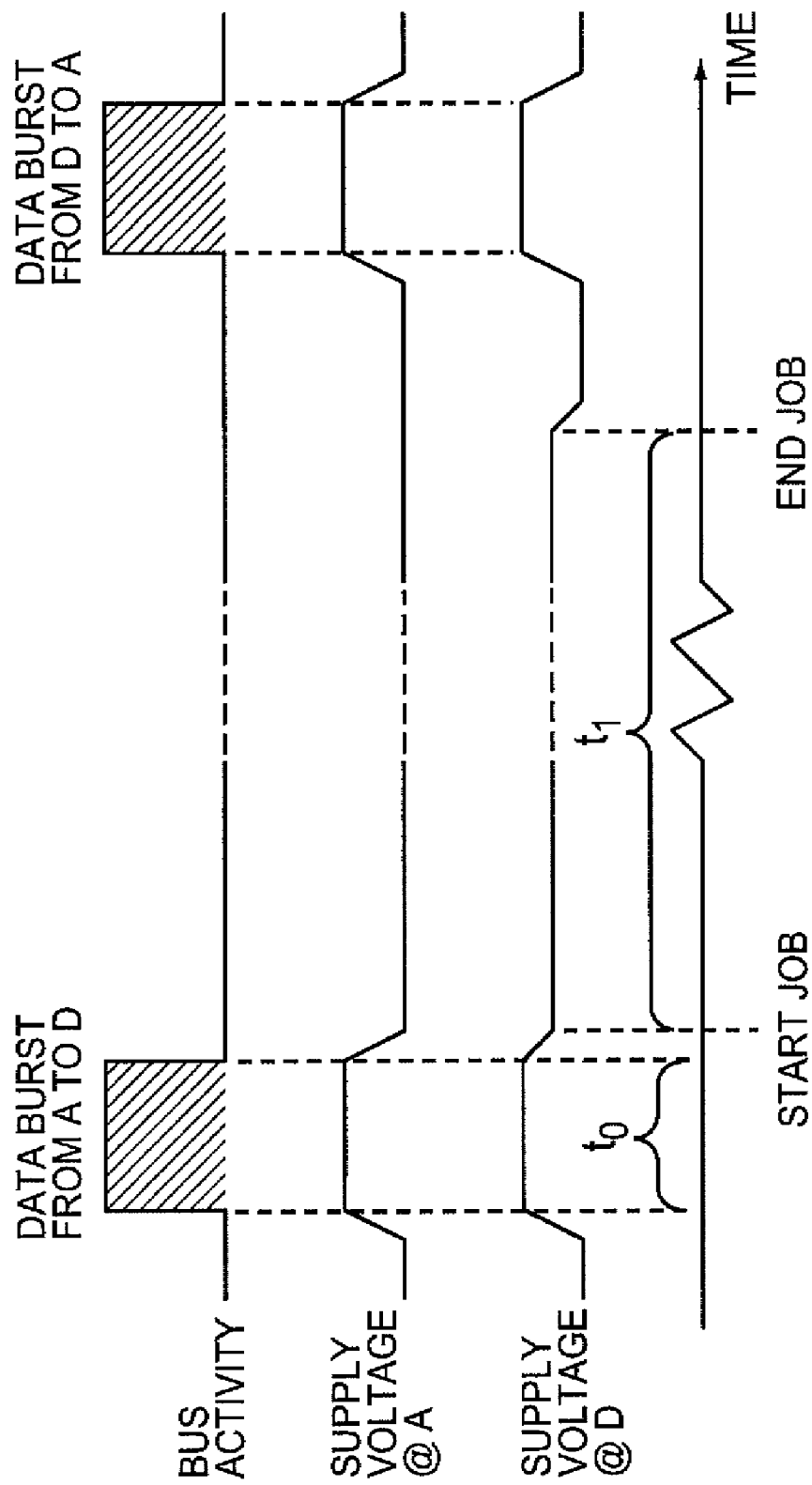
FIG. 3 is a timing diagram of voltage domain D from FIG. 1 operating at a lower supply voltage than domain A.

FIG. 3 depicts a similar sequence, but in which the supply voltage level supplied to voltage domain D during $t_1$, following the initial data transfer, is lower than the supply voltage level of voltage domain A. This may represent, for example, an embodiment in which the system bus voltage level is predefined (as depicted in FIG. 3), or one in which the supply voltage level supplied to voltage domain A is fixed. In either case, the supply voltage level supplied to voltage domain D during $t_1$ is lower. This may correspond to a computational load for which the voltage domain D may operate at a lower clock speed, thus conserving power. Here again, the supply voltage level may be reduced further after computation completes at the expiration of $t_1$, marked "end job," until the next data transfer operation on the system bus.

In some embodiments, such as where circuits in a voltage domain must operate continuously to meet performance goals, lowering the supply voltage level to match, or nearly match, another voltage domain's supply voltage level or a predefined system bus voltage level may be avoided. In one embodiment, the supply voltage level supplied to one or more voltage domains may be fixed to that of a voltage domain comprising memory, or to a predefined system bus voltage level. In this case, if such supply voltage level is lower than that optimally required by the voltage domain, performance may be limited. Conversely, a system bus voltage level may be defined as that of the voltage domain requiring the highest supply voltage level.

Another way to allow one or more voltage domains to operate with a constant supply voltage level is by double buffering data. For example, memory circuits in, e.g., voltage domain A may be segmented, with one segment operating at a supply voltage level matched or nearly matched to, e.g., voltage domain D, and another segment operating at an optimal supply voltage level for the memory, or variable between a data transfer supply voltage level and a standby supply voltage level. In some of these embodiments, some direct data transfer between the memory segments may be accomplished by using level shifters on a subset, e.g., 8 or 16 bits, of the memory width.

Figure 4:
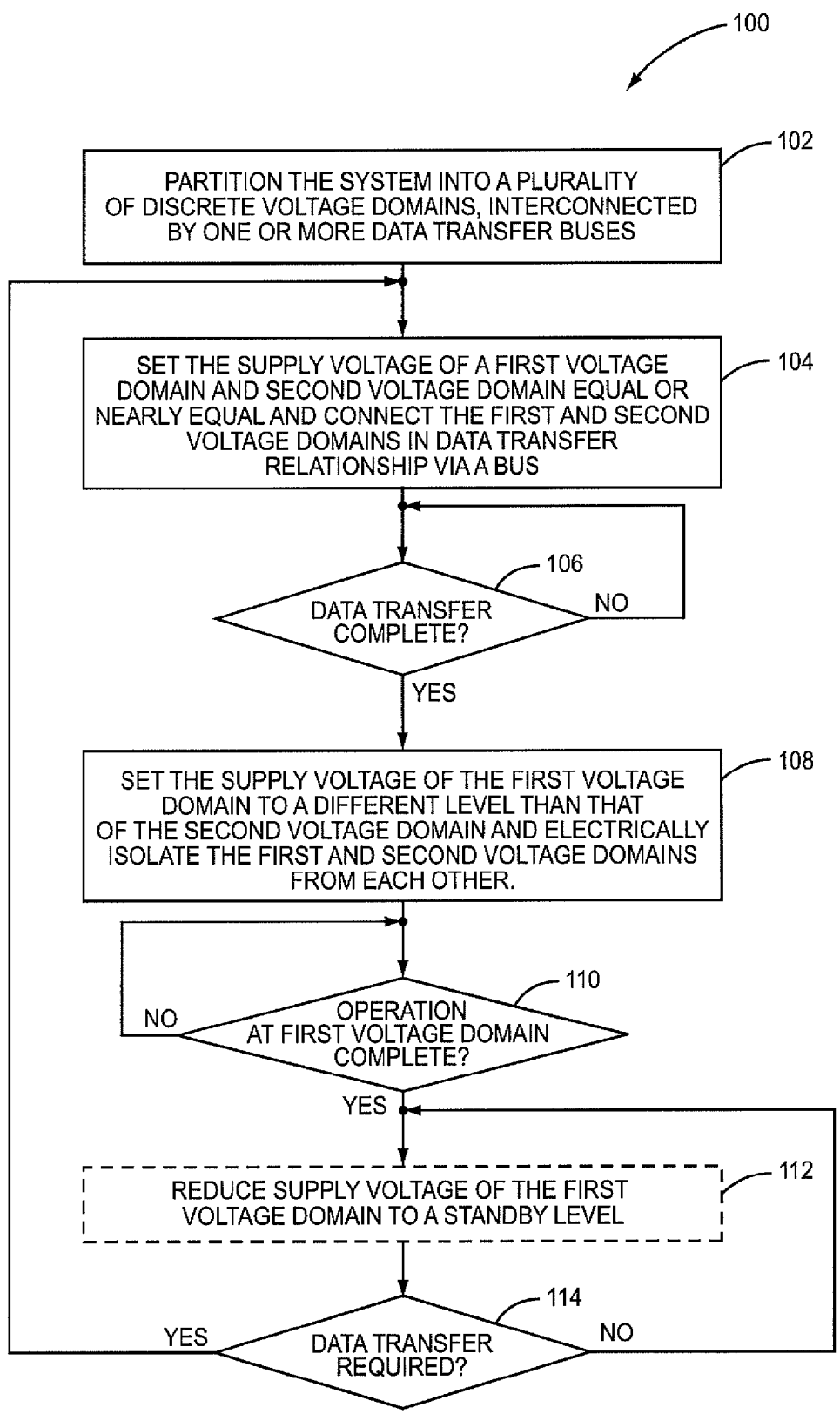
FIG. 4 is a flow diagram of a method of operating voltage domains in an electronic system at different supply voltages.
Figure 5:
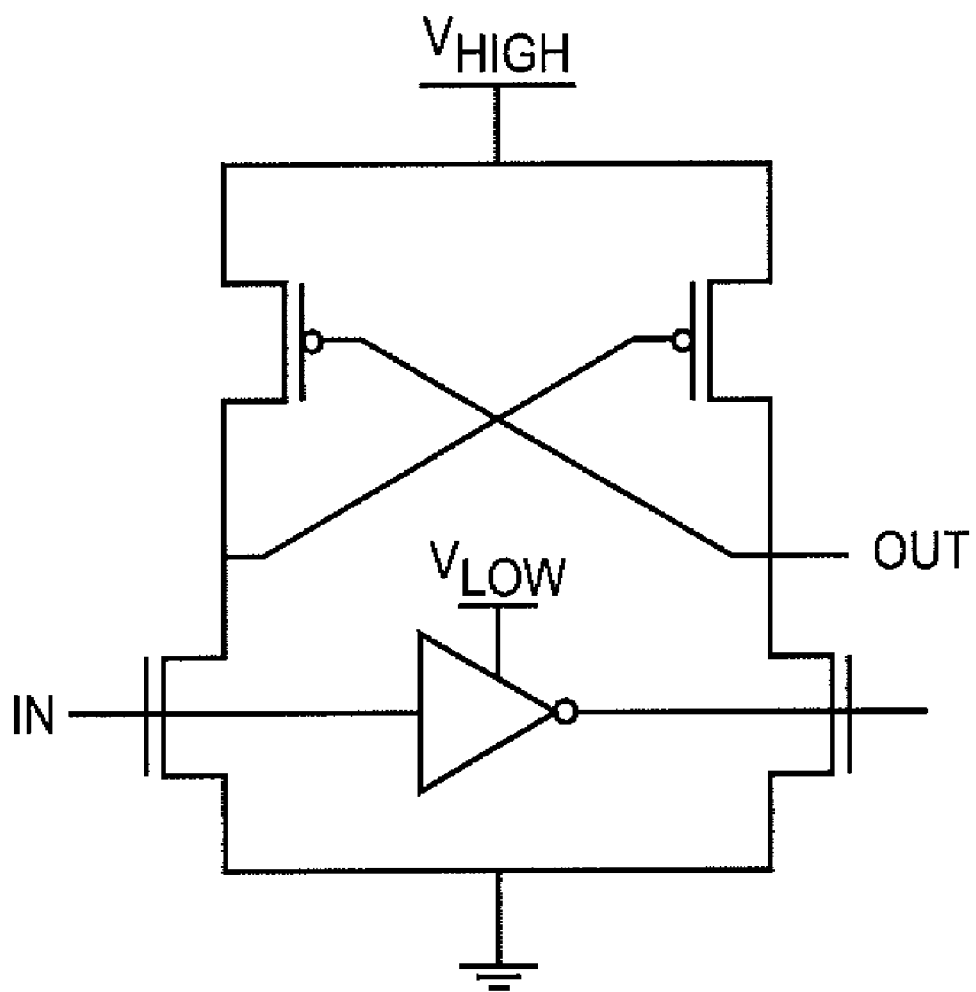
FIG. 5 is a representative circuit diagram of a prior art voltage level shifter.

FIG. 4 depicts a method 100 of operating electronic system at a plurality of supply voltage levels without level shifting individual data signals. Initially, the system is partitioned into a plurality of discrete voltage domains interconnected by one or more data transfer buses (block 102). The supply voltage level of a first voltage domain is set equal or nearly equal to that of a second voltage domain, and the first and second voltage domains are connected in data transfer relationship via a bus (block 104). These supply voltage levels are maintained for the duration of a data transfer, which may for example comprise a burst transfer comprising a predetermined number of bus cycles. When the data transfer is complete (block 106), the supply voltage level supplied to the first voltage domain is set to a different value than the supply voltage levels supplied to the second voltage domain, and the first and second voltage domains are electrically isolated from each other (block 108), such as by tri-stating bus drivers. As discussed above, the supply voltage level supplied to the second voltage domain may remain constant, or may reduced to a standby level pending access to the second voltage domain by another voltage domain.

Circuits comprising the first voltage domain perform one or more operations at the supply voltage level different than that of the second voltage domain (block 110), which may, in various embodiments, be a voltage level higher or lower than that supplied to the second voltage domain. In one embodiment, upon the completion of operations at the first voltage domain (block 110), the supply voltage level supplied to the first voltage domain may be reduced to a standby level (block 112). The standby level may be maintained, for example, pending arbitration for system bus resources. However, this step is optional, as indicated by the dashed-line of block 112. If a subsequent data transfer to or from the first voltage domain is required (block 114), the supply voltage level supplied to the first voltage domain is again set equal or nearly equal to that supplied to another voltage domain (e.g., the second voltage domain), and the two voltage domains are electrically connected in data transfer relationship via a bus (block 104). Otherwise, the first voltage domain may be maintained at the operating supply voltage level or a standby supply voltage level, as desired or required in particular embodiments.

At a minimum, embodiments of the present invention comprises at least one discrete voltage domain of an electronic system having a variable supply voltage level operative to match or nearly match the supply voltage level of a different voltage domain when electrically connected in data transfer relationship, and operative to differ from the supply voltage level of the different voltage domain would electrically isolated therefrom. In other embodiments, two or more voltage domains within a system may have independently variable supply voltage levels, matching or nearly matching their supply voltage levels went interconnected for data transfers, and otherwise operating at disparate supply voltage levels. The supply voltage levels supplied to each voltage domain are preferably controlled by a central supply voltage control circuit. Alternatively, one or more voltage domains may include an independently variable supply voltage controller, having sufficient control signals to coordinate voltage supply levels with other voltage domains.

According to embodiments of the present invention, an electronic system may be functionally partitioned, and discrete voltage domains operated at locally optimal supply voltage levels, without the costly area, power, and delay penalties of level-shifting large numbers of signals, such as data and address buses. This is of particular advantage to low-power, high-performance designs, and designs incorporating analog circuits that require higher supply voltages than digital circuits. Embodiments of the present invention may be particularly suited for Globally Asynchronous Locally Synchronous (GALS) architectures, in which electronic systems are partitioned into independent clock domains.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating an electronic system at a plurality of supply voltage levels without level shifting individual data signals, comprising:

partitioning the system into a plurality of discrete voltage domains, the voltage domains interconnected by one or more data transfer buses;

setting the supply voltage of a first voltage domain and second voltage domain equal or nearly equal for a first duration, during which the first and second voltage domains are connected in data transfer relationship via a bus; and setting the supply voltage of the first voltage domain to a different level than that of the second voltage domain for a second duration, during which the first and second voltage domains are electrically isolated from each other.

2. The method of claim 1 wherein control signals between the first and second voltage domains are voltage level shifted when the domains are set to different supply voltage levels.

3. The method of claim 1 wherein the supply voltage of the first voltage domain is set to a higher level than the supply voltage of the second voltage domain during the second duration.

4. The method of claim 1 wherein the supply voltage of the first voltage domain is set to a lower level than the supply voltage of the second voltage domain during the second duration.

5. The method of claim 1 wherein the first voltage domain comprises a computational circuit, and wherein the second voltage domain comprises memory.

6. The method of claim 5 wherein the computational circuit reads data from memory during the first duration and processes the data during the second duration, and further comprising setting the supply voltage of a first voltage domain and second voltage domain equal or nearly equal for a third duration, during which the computational circuit writes data to memory.

7. The method of claim 1 wherein the system implements a Globally Asynchronous Locally Synchronous (GALS) architecture, wherein each voltage domain is independently clocked.

8. An electronic system, comprising:
a first circuit having a variable supply voltage and comprising a first voltage domain;
a second circuit comprising a second voltage domain;
a data transfer bus configurably connecting at least the first and second voltage domains; and
a voltage control circuit supplying a variable supply voltage to at least the first voltage domain;
wherein the voltage control circuit is operative to set the supply voltage supplied to the first voltage domain equal or nearly equal to the supply voltage of the second voltage domain during a first duration during which the first and second voltage domains are connected in data transfer relationship via the bus; and
wherein the voltage control circuit is operative to set the supply voltage supplied to the first voltage domain differently than the supply voltage of the second voltage domain during a second duration during which the first and second voltage domains are electrically isolated from each other.

9. The system of claim 8 wherein the data transfer bus is a tri-state bus.

10. The system of claim 8 further comprising level shifters operative to shift the voltage level of control signals between the first and second voltage domains when the domains are set to different supply voltage levels.

11. The system of claim 8 wherein the voltage control circuit is operative to set the supply voltage supplied to the first voltage domain higher than the supply voltage of the second voltage domain during the second duration.

12. The system of claim 8 wherein the voltage control circuit is operative to set the supply voltage supplied to the first voltage domain lower than the supply voltage of the second voltage domain during the second duration.

13. The system of claim 8 wherein the first circuit comprises a computational circuit, and wherein the second circuit comprises memory.

14. The system of claim 8 further comprising a clock circuit operative to supply each voltage domain with an independent clock signal.

15. The system of claim 14 wherein the system implements a Globally Asynchronous Locally Synchronous (GALS) architecture.

* * * * *